L. A. BEVIS.
FERTILIZER DISTRIBUTER.
APPLICATION FILED JUNE 28, 1915.
1,165,490.
Patented Dec. 28, 1915.
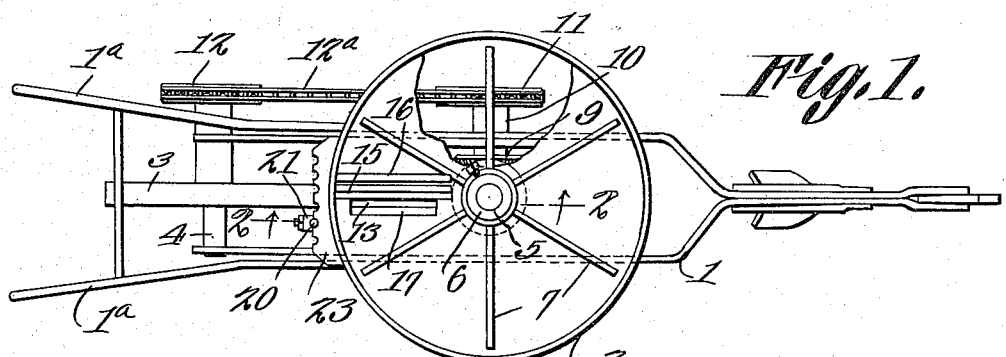
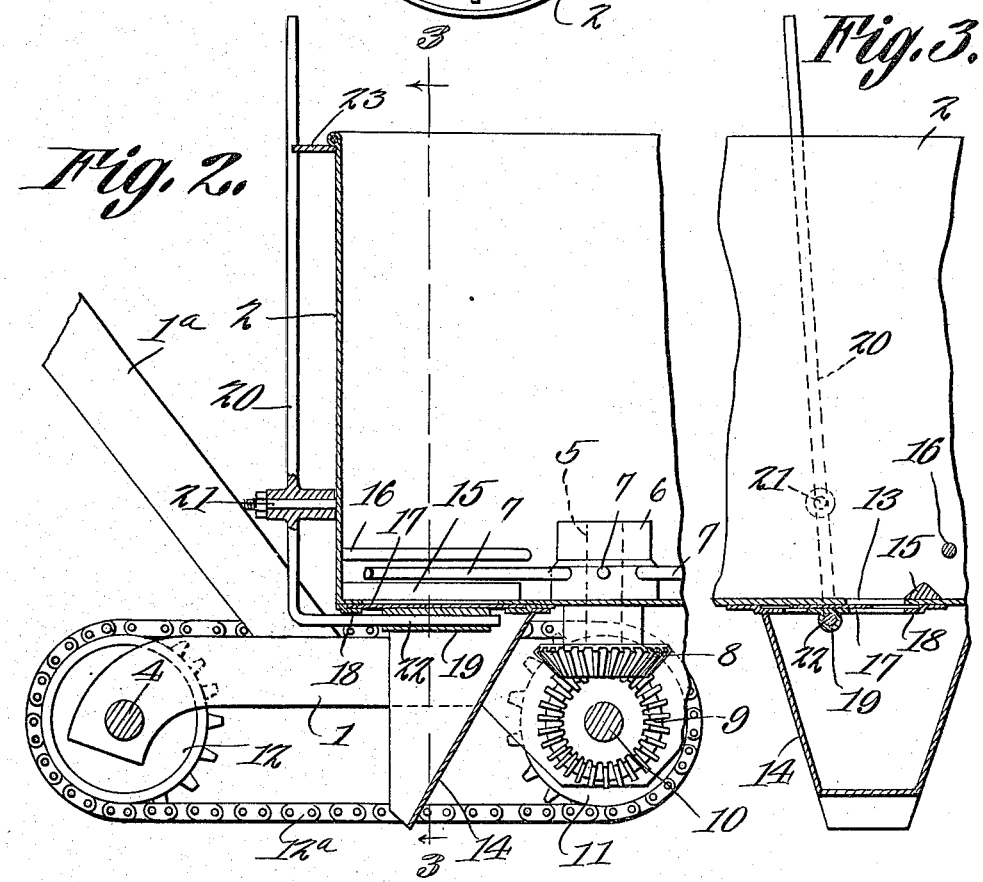
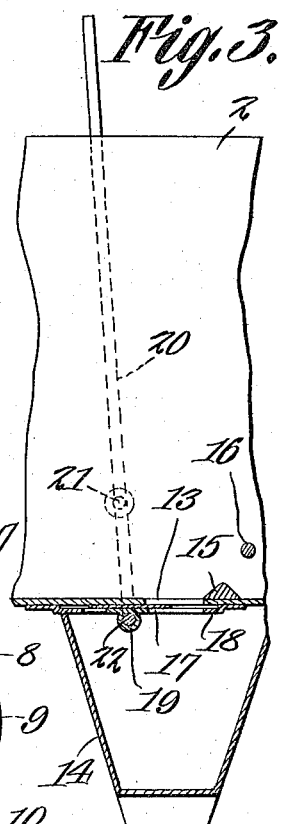
L. A. Bevis
Inventor,
Witnesses
by C. A. Snow & Co.
Attorneys.

UNITED STATES PATENT OFFICE.

LONNIE ANDERSON BEVIS, OF ROANOKE, ALABAMA.

FERTILIZER-DISTRIBUTER.

1,165,490.

Specification of Letters Patent. Patented Dec. 28, 1915.

Application filed June 28, 1915. Serial No. 36,815.

*To all whom it may concern:*

Be it known that I, LONNIE A. BEVIS, a citizen of the United States, residing at Roanoke, in the county of Randolph and State of Alabama, have invented a new and useful Fertilizer-Distributer, of which the following is a specification.

The present invention appertains to fertilizer distributers, and aims to provide a device of that character having improved features of construction to enhance the utility and efficiency thereof.

It is the object of the invention to provide a distributer having unique means for stirring the fertilizer and working it to the outlet opening of the receptacle, and novel means for controlling the discharge of the fertilizer.

It is also within the scope of the invention to provide a fertilizer distributer having the above mentioned improvements, and which at the same time is comparatively simple and inexpensive in construction, as well as being practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the improved fertilizer distributer; Fig. 2 is an enlarged vertical section thereof taken on the line 2—2 of Fig. 1. Fig. 3 is a sectional view on the line 3—3 of Fig. 2.

The distributer embodies a suitable frame 1 having handles 1ª at its rear end, and carrying a suitable receptacle 2 for holding the fertilizer. A ground or supporting wheel 3 is disposed within the rear portion of the frame 1 and is secured upon an axle 4 journaled through the frame.

A vertical stub shaft 5 is journaled through the central portion of the bottom of the receptacle 2 and a hub 6 is secured upon the shaft 5 and seats upon the bottom of the receptacle. The hub 6 is equipped with a plurality of radial stirring or agitating arms or rods 7 working close adjacent or immediately above the bottom of the receptacle. The agitator or stirrer is operated from the wheel 3, and to this end, a bevel gear 8 is secured to the lower end of the shaft 5 and meshes with a bevel gear 9 secured upon a transverse counter shaft 10 journaled through the frame 1. Sprocket wheels 11 and 12 are secured upon the shafts 10 and 4, respectively, and an endless sprocket chain 12ª is trained around said sprocket wheels, whereby when the wheel 3 is rotated during the forward movement of the distributer, the agitator will be rotated within the receptacle 2.

The bottom of the receptacle 2 is provided adjacent the rear wall of the receptacle with a radial outlet opening or slot 13, and a chute or boot 14 is secured to the bottom of the receptacle below the opening 13 for delivering the fertilizer properly to the ground or furrow. The bottom of the receptacle 1 is provided with a radial V-shaped rib 15 along one edge of the opening 13 whereby the arms 7 cross the rib 15 after passing the opening 13, the rib 15 thus serving to retard or arrest the fertilizer moved with the arms 7 below the same, so that the fertilizer will drop through the opening 13. The rib 15 extends forwardly from the back wall of the receptacle, and a finger 16 is secured in any suitable manner to the back wall of the receptacle and projects forwardly parallel with and above the rib 15. The arms 7 of the agitator move between the rib 15 and finger 16, and this serves to effectively arrest the motion of the fertilizer carried with the arms 7 when the arms 7 pass over the opening 13. This also serves to break up or disintegrate the fertilizer in order that it will flow properly through the opening 13.

As a means for controlling the flow of fertilizer through the opening 13, a flat shutter or valve 17 is disposed below and bears against the bottom of the receptacle 2, and is guided for transverse movement to and from said opening by means of a suitable guide 18 attached to the bottom of the receptacle. The shutter 17 has a depending longitudinal sleeve 19, which is arranged horizontally parallel with the opening or slot 13. The shutter 17 is operated by means of a hand lever 20 disposed in rear of the back wall of the receptacle 2, and having its long arm projecting upwardly to be conveniently manipulated by the hand. The lever 20 is fulcrumed, as at 21, to the back wall of the receptacle adjacent the bottom of said receptacle, and the lower short arm of the lever 20 is provided with a forwardly projecting or angularly extending extension 22 fitting snugly within the sleeve 19, whereby when the lever 20 is oscillated laterally, the shutter 17 will be moved similarly for increasing or decreasing the size of the fertilizer outlet. A notched rack 23 is attached to the back wall of the receptacle adjacent the upper edge thereof, and projects rearwardly for the engagement of the upper arm or handle of the lever 20, said lever being sufficiently resilient to spring into the notches of the rack or plate 23 when the lever is released. This holds the lever at the position to which it is swung, in order that the shutter 17 will not become displaced accidentally.

When the distributer is in operation, the fertilizer within the receptacle 2 will be agitated or stirred from below, whereby the fertilizer will be loosened and worked toward the opening 13 so as to gravitate therethrough. The discharge of fertilizer is regulated by adjusting the lever 20, to properly position the shutter 17, said shutter being projected more or less across the opening 13 for the intended purpose.

The present improvements results in the fertilizer being properly agitated and delivered according to the rate of flow desired, and the improved features are advantageous for reasons which will be obvious from the foregoing, taken in connection with the drawing.

What is claimed as new is:

1. In a device of the character described, a receptacle having a radial opening in its bottom adjacent one wall thereof, a shaft journaled through the bottom of the receptacle, a hub secured upon said shaft and seating upon the bottom of the receptacle, and a plurality of radial arms carried by said hub to work over said opening, the bottom of the receptacle having an upstanding radial rib along one edge of said opening and extending from said wall.

2. In a device of the character described, a receptacle having a radial opening in its bottom adjacent one wall thereof, a shaft journaled through the bottom of the receptacle, a hub secured upon said shaft and seating upon the bottom of the receptacle, a plurality of radial arms carried by said hub to work over said opening, the bottom of the receptacle having an upstanding rib along one edge of said opening and extending from said wall, and a finger carried by said wall above and parallel with said rib, said arms working between said rib and finger.

3. In a device of the character described, a receptacle having an opening in its bottom adjacent one wall thereof, a shutter disposed below the bottom of the receptacle and coöperable with said opening, a guide for the shutter attached to the bottom of the receptacle, the shutter having a depending sleeve, a lever fulcrumed to said wall of the receptacle and having an angularly projecting extension at its lower end fitting in said sleeve, and a rack carried by said wall of the receptacle for the engagement of said lever.

In testimony that I claim the foregoing as my own, I have hereto affixed my signature in the presence of two witnesses.

LONNIE ANDERSON BEVIS.

Witnesses:
J. M. ZACHRY,
J. M. SEAVY.